Oct. 8, 1935.  H. HARPER ET AL  2,016,281
COFFEE MAKING MACHINE
Filed July 17, 1931  5 Sheets-Sheet 3

Inventors
HARRY HARPER
CHARLES R. CARPENTER
By Paul, Paul & Moore
ATTORNEYS

Oct. 8, 1935.  H. HARPER ET AL  2,016,281
COFFEE MAKING MACHINE
Filed July 17, 1931   5 Sheets-Sheet 4
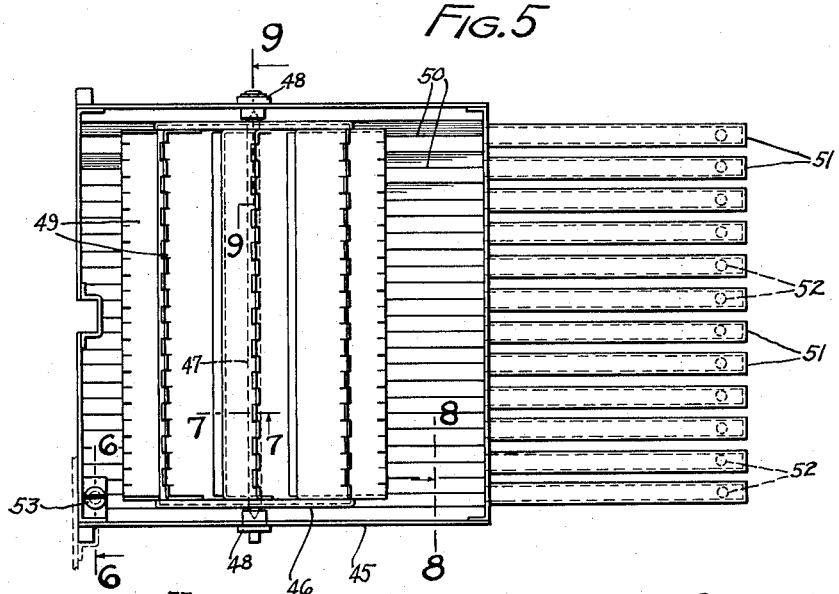
FIG. 5
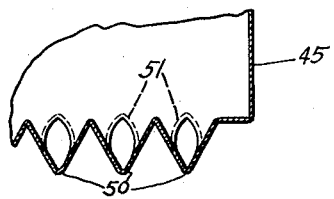
FIG. 6
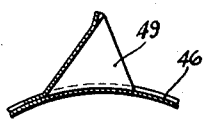
FIG. 7
FIG. 8
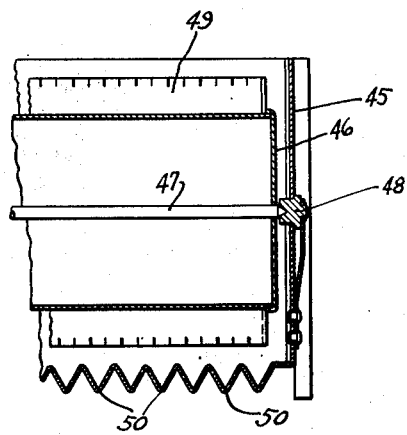
FIG. 9
Inventors
HARRY HARPER
CHARLES R. CARPENTER
ATTORNEYS Oct. 8, 1935.  H. HARPER ET AL  2,016,281
COFFEE MAKING MACHINE
Filed July 17, 1931   5 Sheets-Sheet 5
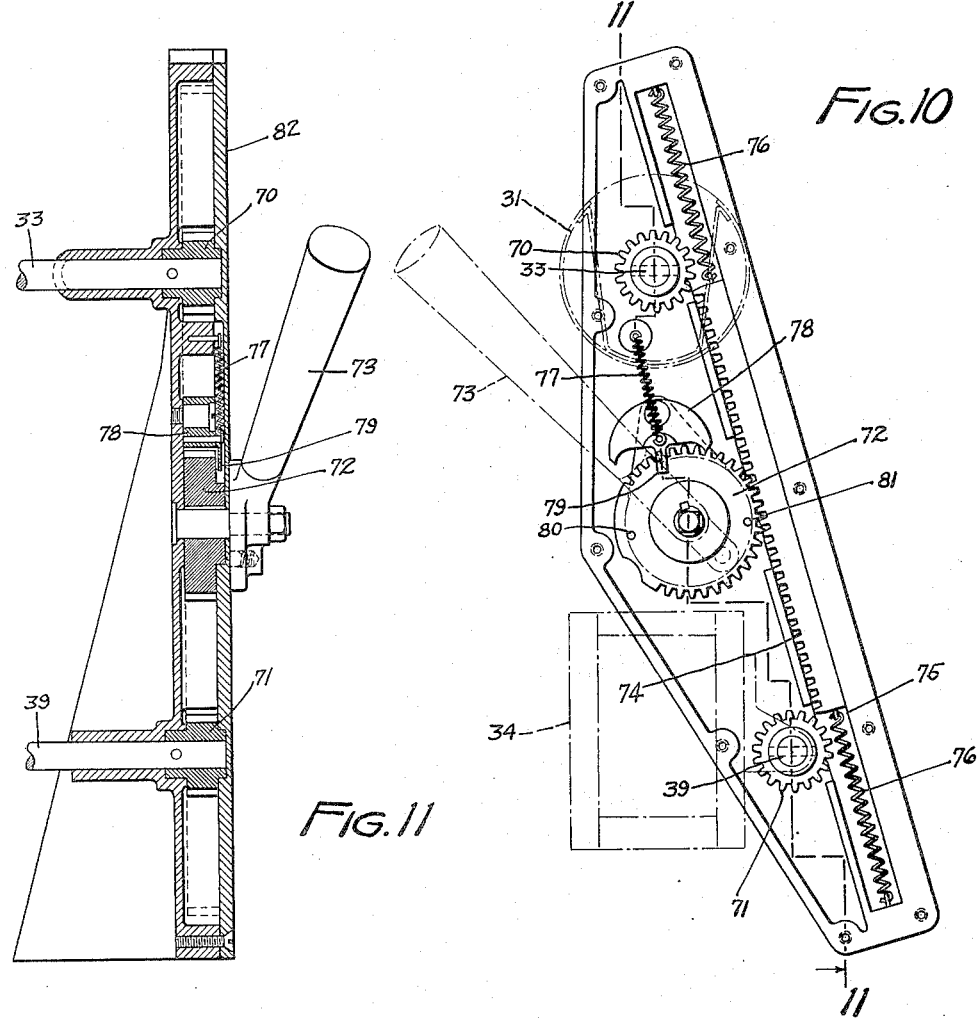
Inventors
HARRY HARPER
CHARLES R. CARPENTER
ATTORNEYS Patented Oct. 8, 1935

2,016,281

UNITED STATES PATENT OFFICE 2,016,281

COFFEE MAKING MACHINE

Harry Harper and Charles R. Carpenter, Minneapolis, Minn.

Application July 17, 1931, Serial No. 551,420

16 Claims. (Cl. 53—3)

This invention relates to coffee making machines and contemplates, in general, the provision of a machine of simple construction for automatically brewing crystal-clear coffee in such quantities as are usually required in restaurants, hotels and the like.

It is an object of the invention to provide a coffee making machine having a filtration receptacle for fresh ground coffee and means for supplying hot water to said ground coffee in predetermined quantities at a predetermined rate of flow.

Still another object is to provide a coffee making machine with a filtration receptacle of novel construction and which may be emptied and cleaned without removing it from the machine by operation of simple mechanism located at the exterior of the machine.

Another object is to provide a coffee machine having a filtration receptacle adapted to receive fresh ground coffee, and said receptacle having a solid bottom bounded by an upright flange whereby the water delivered onto the coffee grounds in the receptacle will not flow directly therethrough, but will engage the bottom of the receptacle whereby it will gradually work outwardly through the ground coffee, and thence through the meshed walls of the receptacle.

Another object is to provide a coffee making machine having water supplying means arranged to discharge water onto the ground coffee in the form of evenly distributed charges and which may be regulated as to rate of flow and quantity in accordance with the strength and other characteristics of the coffee to be brewed.

Another object is to provide a coffee making machine comprising a rotary water-distributing member adapted to intermittently deliver the water onto the ground coffee in the receptacle in the form of small charges, and whereby the water may seep slowly through the ground coffee and thus avoid forcing small coffee particles through the reticulated walls of the receptacle.

Still another object is to provide a coffee making machine with a supply hopper for fresh ground coffee, the said hopper having a measuring device whereby a predetermined quantity of ground coffee may be introduced into the filtration receptacle.

Still another object is to provide a machine of the character set forth in which the coffee measuring device and filtration receptacle may be operated by manipulation of a common mechanism of simple construction located at the exterior of the machine.

A further object is to provide a coffee making machine with a water jacket adapted to contain a quantity of hot water and an auxiliary water tank adapted to receive from said jacket a quantity of water required for a single coffee making operation, the parts being so arranged that when the water in said jacket expands it will not overflow into said tank, and said auxiliary tank being insulated at its sides by said water jacket and at its top by the steam and vapors rising from the hot water in the tank, whereby the water in said tank may be maintained at a predetermined temperature.

A further object is to provide a coffee making machine having a water jacket and an inlet for cold water, and a baffle in said jacket adjacent said inlet whereby cold water will remain near the bottom of the jacket and the hot water will rise and overflow into an auxiliary water tank.

Another object is to provide a coffee making machine with a plurality of signals or indicating means which will at all times apprise an operator as to the condition and quantity of the coffee making ingredients within the machine.

Another object is to provide a coffee making machine having a container in the lower portion thereof adapted to receive the brewed coffee, and said container being provided with a cover adapted to close the open top thereof to prevent the escape from the coffee of the aroma and light volatile oils, and other fumes thereof, which otherwise would be carried off by the vapors rising from the hot coffee, thereby improving the quality of the coffee, and said cover being disposed beneath the coffee receptacle, whereby the brewed coffee discharging from said receptacle through the meshed walls thereof, will be precipitated onto the cover and will flow through a small hole or opening therein into the closed liquid container.

A further object is to provide a machine of the class described comprising a liquid coffee container provided with a cover which is substantially tight fitting and is provided with a small filler opening whereby the cover need not be removed from the container when introducing freshly made coffee therein, and whereby the hot vapors and fumes of the hot coffee in the container will condense on said cover and be returned to the container, thereby eliminating loss by vaporization, and at the same time improving the flavor of the coffee.

Other objects reside in the provision of the thermo-chamber in the lower portion of the machine wherein the liquid coffee container is positioned and whereby the coffee in said container may be maintained at a substantially uniform temperature; in the drain provided in the thermo-chamber whereby condensate and any spilled or overflow water or coffee may drain therefrom; in the means provided for manually introducing water in the machine in case of failure of the usual water supply; and, in the means provided for controlling the temperature of the water passing through the ground coffee in the filtration receptacle, and which also controls the temperature of the finished liquid coffee after it has collected in the closed coffee container in the lower portion of the machine.

The invention contemplates numerous other improvements and possesses many distinct advantages which will appear as the description proceeds.

In the accompanying drawings, we have illustrated in considerable detail a practical embodiment of our invention. These drawings, however, are illustrative, merely, so that those skilled in the art may understand the construction and operation of our machine. It is expressly understood that we do not limit ourselves to the details of construction herein shown and described as our invention may be embodied in a great variety of forms, differing from the example herein given, but without departing from the scope of the invention as defined in the appended claims.

In these drawings:

Fig. 5 is a plan view of the water distributing wheel of our invention and associated parts;

Figure 1:
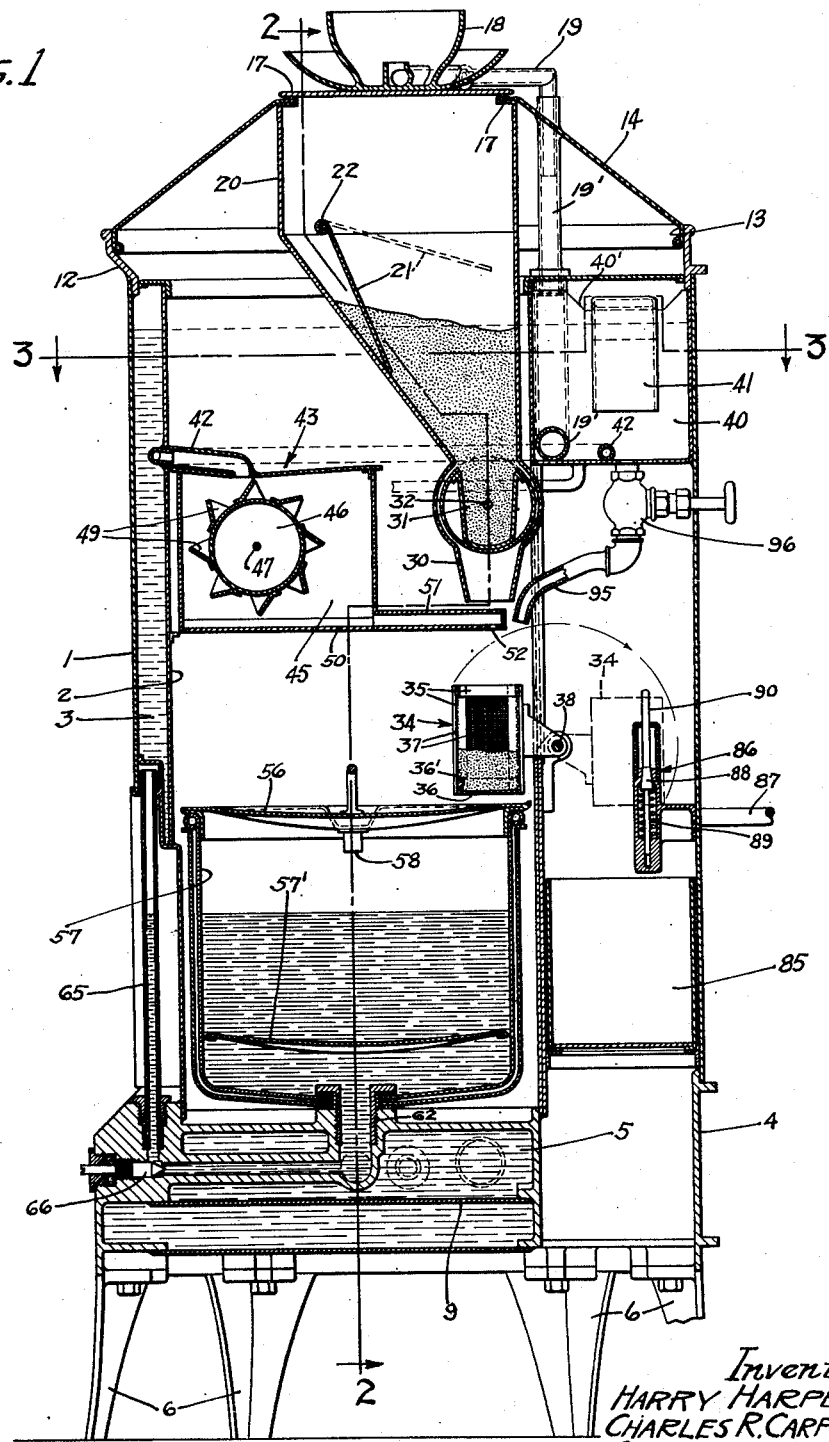
Fig. 1 is a view in vertical section substantially through the center of our machine, taken on line 1—1 of Fig. 2.

Figs. 6, 7, 8 and 9 are fragmentary sectional views of parts of the water distributing mechanism taken, respectively, on lines 6—6, 7—7, 8—8, and 9—9 of Fig. 5;

Fig. 10 is a view in side elevation of the mechanism for emptying the coffee filtration receptacle and for operating the coffee measuring device; and Fig. 11 is a sectional view taken on line 11—11 of Fig. 10.

Referring now to the drawings, the reference numeral 1 indicates the exterior wall of our machine, and the reference numeral 2 an interior wall, spaced from the wall 1 to provide a water jacket 3.

The machine is provided with a base 4 in which is located a water chamber 5 communicating with said water jacket 3. The machine is supported on suitable legs 6 which space the bottom of the machine from the top of a table or counter to provide room for a heating element 7 which will be located quite close to the bottom of the machine.

The heating element 7 is preferably a gas burner of suitable construction but it is obvious that other forms of heating devices may be used, such as electric heaters.

A cold water inlet pipe 8 connects with the base 4 for introducing cold water into the machine. The said pipe 8 may desirably be connected with the city water system or any other source of water. As will hereinafter be more fully brought out, cold water may be introduced into the machine without its coming through the pipe 8, in case of failure of the water supply or for other reasons.

Within the base 4 in line with the pipe 8, we have mounted a baffle plate 9 which serves to prevent the cold water introduced into the base from rising too rapidly into the water jacket. By reason of the position of the said baffle plate, the cold water entering the base will force the hot water therein up into the jacket and cause it to rise and overflow into an auxiliary water tank presently to be described.

Secured to the base 4 is an automatic valve 10 for controlling the burner 7, the said valve having a thermostatic element 11 projecting into the water chamber 5. The said thermostatic valve is so arranged that it will respond quickly to small changes in the temperature of the water in the chamber 5 and thus, turn on or shut off the flow of gas to the burner 7. In case an electric heating element is used, a similar thermostatic device may be employed for controlling the heat of said element.

The top of the machine is provided with a flange 12 extending about the top of the exterior wall 1 and which is adapted to receive a flange 13 formed around the lower edge of a suitable cover 14. For a purpose which will presently be clear, the cover 14 is provided with an opening 15 which is closed by means of an auxiliary cover 16. A suitable gasket or packing element 17 is interposed between the cover 16 and the edge of the cover 14 surrounding the said opening 15.

Figure 2:
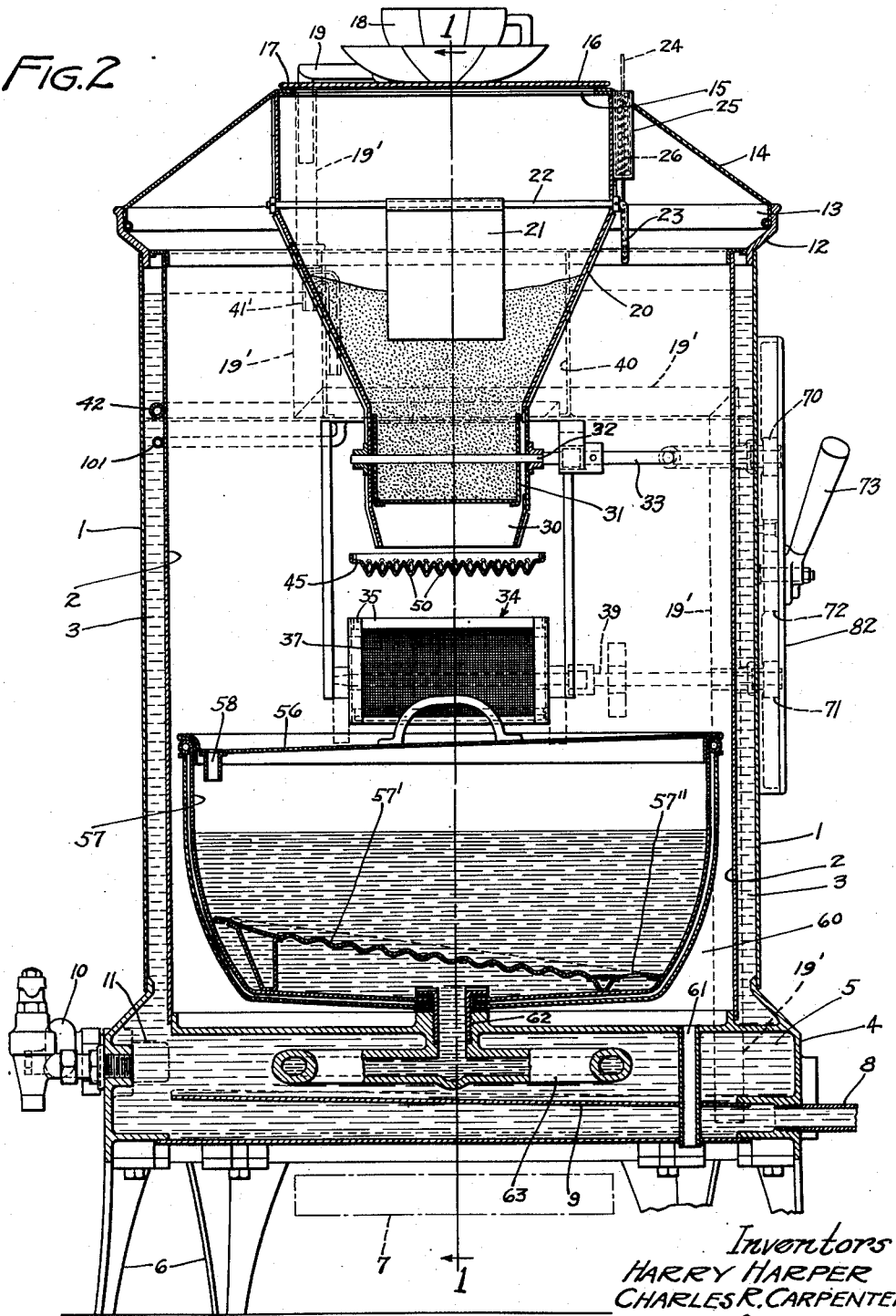
Fig. 2 is a vertical sectional view taken on line 2—2 of Fig. 1.

Upon the cover 16, we have mounted a display device 18 in the form of a cup and saucer. A right angled pipe 19 extends from this device and has its depending portion fitted into the upper end of a relatively larger pipe 19', passing downwardly through the water jacket and having its lower end terminating in the lower water chamber 5, adjacent to the water supply pipe 8, as shown in Figure 2. This device provides means whereby fresh water may be introduced into the lower portion of the machine, should the water supply to the pipe 8 accidentally be cut off. Thus, the cup and saucer not only enhance the appearance of our machine, but provide means whereby water may be manually introduced into the lower portion or bottom of the water jacket 3.

Secured in any suitable manner to the cover 14 and extending into the interior of the machine, is a coffee supply hopper 20 designed to contain a relatively large supply of ground coffee to be introduced into the filtration receptacle which will presently be described. Access to the interior of the hopper 20 may be had by raising the auxiliary cover 16. By mounting the hopper 20 in the manner described it will be clear that steam and moisture from the interior of the machine or condensate from the cover 14 cannot enter the hopper and thus, the coffee therein is maintained in fresh condition.

The coffee hopper 20 is provided with an indicating device which will inform the operator when the supply of coffee is nearly exhausted that it is necessary to replenish the hopper. This device includes a plate 21 mounted on a rod 22 journalled in the side walls of the hopper, said rod having a crank 23 at the exterior of the hopper connected to an indicating rod 24 slidable in a housing 25. Within the said housing is a coiled spring 26 tending constantly to urge said rod 24 out of said casing, thereby turning said crank 23 and swinging said plate 21 upward. This arrangement is such that when ground coffee is deposited in the hopper, the weight of it will depress the plate 21 to the solid line position shown in Fig. 1 and at this time, the indicating rod 24 is within the housing 25. As the supply of coffee is depleted, the plate 21 will swing upward to the dotted line position shown in Fig. 1 under action of the spring 26 and thereupon the indicating rod 24 will be forced out of the housing 25 to the dotted line position shown in Fig. 2. The indicating rod 24 may be suitably colored to render it readily visible.

The lower end of the supply hopper is provided with a discharge spout 30 in which is located a measuring device 31. This measuring device is designed to contain the quantity of ground coffee required for one coffee making operation. The measuring device is secured to a shaft 32 journalled in the sides of the hopper and connected to an operating shaft 33 which extends to the exterior of the machine where it is connected to an operating mechanism presently to be described. Rotation of the measuring device will cause a predetermined quantity of ground coffee to be discharged into the filtration receptacle immediately below.

Reference numeral 34 indicates generally, what we shall term a filtration receptacle because it contains the ground coffee through which hot water is passed to make the infusion. The receptacle is here shown, comprising a plurality of frame members 35 providing open sides and a solid bottom 36, preferably constructed of a suitable non-corroding metal, such as monel. The open sides are covered by suitable screens 37 of a fine mesh to prevent the escape of coffee grounds therethrough. The bottom 36 is bounded by an upright flange 36', as shown in Figure 1, whereby the water cannot pass directly through the ground coffee, but must gradually work its way therethrough to the outer portions of the receptacle, and thence through the meshed walls thereof. It will be understood that the said receptacle will be made of a size to conform to the capacity of the machine and will be of greater depth than required for the quantity of coffee introduced to provide for expansion and to prevent overflow of the ebullition or effervescence which results when hot water is first brought into contact with the ground coffee. In the drawings, we have shown the filtration receptacle as being rectangular in shape, but it is to be understood that in some instances, it may be desirable to make it cylindrical, or some other suitable shape, depending upon the machine with which it is to be used. The above described receptacle is generally disclosed, but not claimed, in the copending application of Harry Harper, Serial No. 500,846, filed December 8, 1930, Patent Number 1,903,111, issued March 28, 1933.

The filtration receptacle is pivotally mounted, as at 38, upon the inner wall 2 and is connected to an operating shaft 39 extending to the exterior of the machine where it is connected to an operating mechanism presently to be described.

Figure 3:
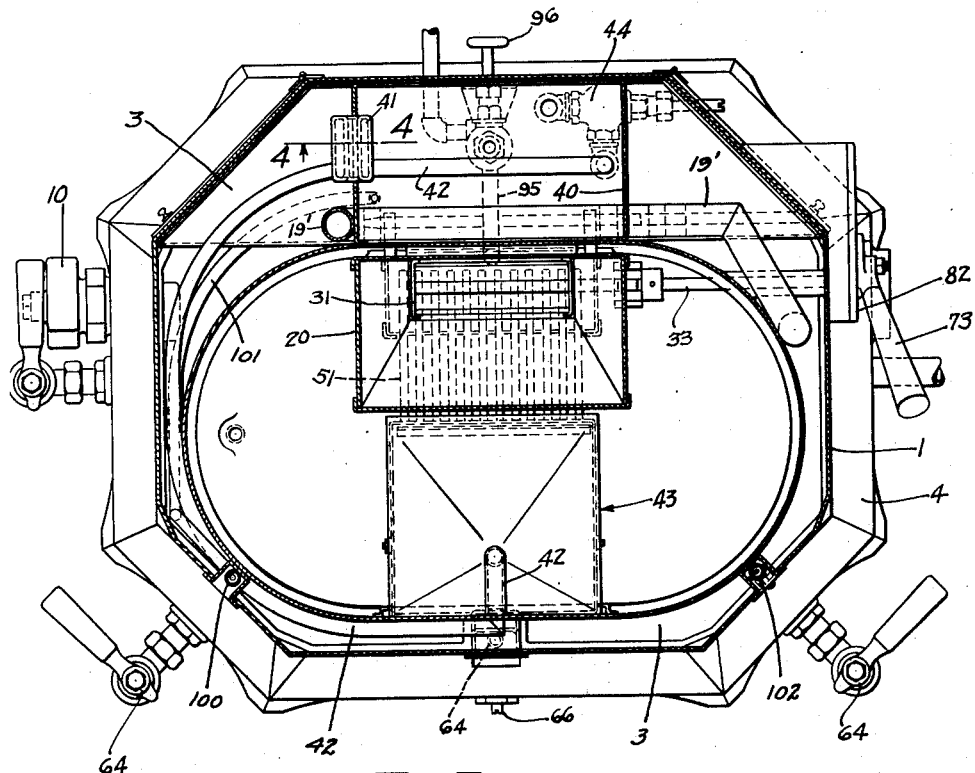
Fig. 3 is a horizontal sectional view on line 3—3 of Fig. 1.

We shall now describe the novel water-distributing mechanism of our machine by operation of which a predetermined quantity of water may be discharged in a fine, uniform spray at a controlled rate of flow upon the ground coffee in the filtration receptacle. This mechanism includes an auxiliary water tank 40 located within the machine near the top thereof and which stands in open communication with the water jacket 3. When coffee is to be made, the required quantity of hot water is introduced into said auxiliary tank from the water jacket 3. This is accomplished by admitting cold water into the base of the machine through the inlet pipe 8, the said cold water forcing the hot water in the jacket 3 upward and over the edge 40' of the tank 40. A suitable water gauge 100, shown at the left hand side of Figure 3, is connected by a pipe 101 to the tank 40 to indicate the amount of hot water which has entered said tank.

Figure 4:
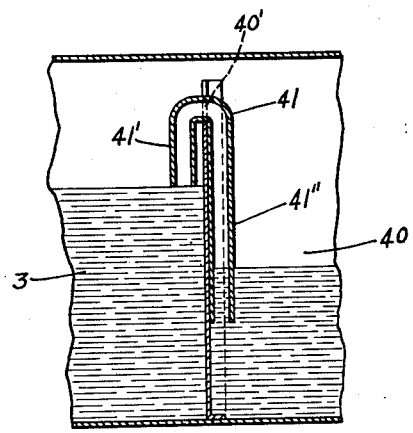
Fig. 4 is a sectional view on line 4—4 of Fig. 3 showing the construction and arrangement of a siphon connecting the water jacket with the auxiliary water tank.

It is desirable that the level of the water in the jacket 3 shall stand below the edge of the tank 40 to provide room for expansion of the water in said jacket when heated so that it will not overflow into the said tank. For this purpose, a siphon 41 is located at the edge 40' of the tank 40 which is provided with a leg 41' depending down into the water jacket. (See Figure 4.) The siphon 41 has a relatively longer leg 41'' extending downwardly into the auxiliary tank 40 whereby as the water level in the tank is lowered, the siphon will draw additional water thereinto from the jacket 3, until the level in the jacket reaches the elevation shown in Figure 4. A gauge 102, similar to the gauge 100, is provided at the right hand side of the machine, as shown in Figure 3, which communicates with the jacket 3 so as to indicate the level of the water therein.

The auxiliary tank 40 is partially surrounded by the hot water in the jacket 3, and is substantially insulated at the top by the steam and water vapors rising from this jacket 3. This is an important feature of the structure, because by thus insulating the walls of the tank, when the water in the jacket is forced over the wall edge 40' of the tank and into the latter, it will be just below the boiling point and must be maintained at high temperature so that it may ultimately come in contact with the ground coffee at a sufficiently high temperature.

A water pipe 42 leads from the auxiliary tank 40 to a water distributing device indicated by the general reference numeral 43. The said pipe 42 is provided with a regulator valve 44 which may be so adjusted as to accurately control the flow of water from the tank 40 to the water distributing device 43. The regulation of the flow of water is important because an essential consideration in the making of good coffee is the time required for the water to pass through the ground coffee to make the infusion.

The water distributing device 43 includes a tank 45 preferably made of non-corroding metal such as monel. Within the said tank 45 is rotatably mounted a water wheel 46 having a shaft 47 journalled in spring pressed bearings 48 in the sides of the tank 45. The said water wheel 46 is here shown comprising a cylindrical body portion provided with a plurality of water pockets 49 as clearly shown in Figures 1 and 7. The edges of the said water pockets are notched and adjacent portions are bent in opposite directions, as shown in Figure 5, to secure a better distribution of the water falling from the said pockets.

The bottom of the tank 45 is provided with corrugations 50 which communicate with a series of tubes 51 leading from the tank and located immediately above the filtration receptacle 34. The tubes 51 are provided with outlet openings 52 of such size and arrangement as to discharge the water in charges onto the ground coffee in the said filtration receptacle, substantially the full length thereof.

The tank 45 is freely supported within the machine in such a manner that it can readily be removed for cleaning or to make repairs if necessary. It may be that when the machine is set up it will not be perfectly level and therefore the water discharged from the water distributing device will not be in a uniform spray. To compensate for this, the tank is provided with a leveling screw 53 in one corner thereof which may be adjusted accurately to level the tank 45 and associated parts.

In operation, water flows from the auxiliary tank 40 through the pipe 42 and onto the water wheel 46 filling one of the pockets 49. This will cause rotation of the water wheel, in the usual manner, and a succeeding pocket will be presented in position to receive water from the pipe 42. Because of the pockets of the wheel filling with water, one at a time, an intermittent action will be imparted to the wheel whereby the water is successively delivered onto the bottom of the tank 45 in small measured quantities or charges. As the water is thus successively emptied from the pockets, it flows along the corrugated bottom of the tank 45 and outwardly through the discharge openings in the tubes 51. Thus, small measured quantities or charges of water are intermittently discharged upon the ground coffee in the filtration receptacle. Moreover, by the water distributing mechanism described, the quantity of water admitted to the ground coffee may be accurately regulated and the rate of flow may be controlled to conform to requirements. This is important because good coffee cannot be made unless an accurately determined quantity of water be made to pass through an accurately determined amount of ground coffee in a predetermined time interval. So far as we are aware this has not heretofore been accomplished in an automatic coffee making machine of the type herein disclosed.

In order to obtain a good extraction of the ingredients of the coffee beans, the beans are preferably ground very fine resulting in some of the particles being almost dust-like. To prevent these finer particles of the ground coffee from being washed through the meshed walls of the filtration receptacle, it is important that the hot water delivered into the receptacle be discharged in the form of small charges or sprays, whereby the water will not channel through the ground coffee and impinge against the walls of the receptacle, but will pass slowly through the body of ground coffee, thereby causing the particles thereof to expand, whereby a plurality of small crevices will appear in the surfaces of the larger particles. It is therefore important that the water delivered into the filtration receptacle be so controlled that upon the swelling of the larger particles of the ground coffee and the opening up of the cells in these particles to liberate the carbon dioxide, that some of the finer particles become lodged or get into the crevices of the larger expanded particles. By thus controlling the supply of water to the receptacle, the finer dust-like particles will not be washed outwardly against the walls of the receptacle and clog the pores thereof, but will remain in the body of the ground coffee so that a thorough extraction is obtained and also, whereby the resultant or finished coffee will be clear and substantially free from sediment.

The water which has dropped from the tubes 51 onto the coffee in the filtration receptacle 34 finds its way out through the screened sides 37 of the said receptacle and drops onto a cover 56 on a coffee container 57. The said cover 56 is slightly inclined, as best shown in Figure 2 and is provided, near one edge, with an opening 58 through which the prepared coffee will find its way into the container 57.

The container 57 for the made coffee may be of any suitable material as, for example, glass, crockery, and the like, or, if desired, it may be made of non-corroding metal. The container 57 is spaced from the inner wall of the machine to provide a chamber 60 which is ventilated by means of a tube 61 extending through the base of the machine and opening to the atmosphere. This chamber also preferably communicates with the chamber in the upper portion of the machine wherein the receptacle 34 and hopper 20 are mounted, as shown in Figures 1, 2, and 3. The said tube 61 also provides means of escape for any water or coffee which might find its way into the said thermo-chamber, so that, should the connection 62 between the container 57 and pipes 63 leak, it may be noted by the operator, because of the coffee dripping from the pipe 61.

The cover 56 of the container 57 fits more or less tightly on the container so as to prevent the aroma and coffee fumes in the finished coffee within the container from escaping therefrom. As these coffee fumes or light volatile oils of the coffee rise, they are condensed on the bottom of the cover 56 and are thereby returned to the liquid coffee. This is a very important feature of the machine in that it assures that all of the aroma and flavor of the coffee will be retained therein. It will also be noted that the cover 56 need not be removed from the container during the process of making coffee, which also is an important feature in that it prevents the escape of the aroma and fumes of the coffee during the operation of making the same.

The bottom of the coffee container 57 is provided with an outlet 62 which communicates with a pipe 63 located in the water chamber 5 and which is, therefore, normally surrounded by the hot water in the said chamber. By this arrangement, the coffee to be served is maintained at the proper temperature at all times. The pipe 63 communicates with suitable faucets 64 through which coffee to be served may be withdrawn from the container 57.

A corrugated plate 57' is preferably provided in the container 57 and is disposed at an incline as shown in Figure 2. An aperture 57'' is provided in the lower portion of the plate through which the coffee flows into the space beneath the plate. By means of this plate, any fine particles of the coffee grounds which might accidentally get into the container 57, will lodge in the corrugations of the plate and will thus be prevented from being withdrawn from the container through the connection 62, thereby assuring that the coffee to be served will always be clear.

A suitable coffee gauge 65 is located at the front of the machine for indicating the quantity of made coffee in the container 57, as shown in Figure 1. A needle valve 66 is located in the opening leading to the said coffee gauge 65 by manipulation of which communication between the container 57 and the gauge 65 may be shut off so that the gauge may be removed and cleaned when desired.

We have heretofore referred to mechanism located on the exterior of the machine by operation of which the contents of the filtration receptacle 34 may be emptied and the measuring device 31 operated to discharge a measured quantity of fresh ground coffee into the said receptacle. This mechanism is best illustrated in Figs. 10 and 11. By inspection of these figures it will be seen that the shafts 33 and 39 are provided with pinions 70 and 71 respectively. A central pinion 72 is provided having a handle 73 by means of which it may be rotated. The pinion 72 engages a rack 74 freely supported in a slideway 75 and provided with pull springs 76 at its ends which tend to maintain said rack in normal position out of engagement with the pinions 70 and 71.

A pawl 78 is mounted for engagement with the pinion 72 and to prevent rotation thereof under the conditions presently to be described. The said pawl 78 is provided with a spring 77 which will hold the pawl in any position to which it is moved. The pawl also has a depending finger 79 which is adapted to be engaged by actuating pins 80 and 81 on the side of the pinion 72.

With the parts in the position shown in Fig. 10, the filtration receptacle 34 may be emptied by turning the handle 73 to the right in the said figure.

Movement of the handle will rotate the pinion 72, whereupon the rack 74 will engage the pinion 71 thus rotating the shaft 39 and swinging the said receptacle 34 about its pivot 38. During this movement the actuating pin 80 will engage the finger 79 and swing the pawl 78 so that the spring 77 will be located to the right of the pivot point of the said pawl.

The receptacle 34 having been emptied, the handle 73 is turned to the left thus restoring the receptacle 34 to its initial position. Continued rotation of the handle 73 to the left will bring the rack 74 into engagement with the pinion 70 which will operate the shaft 33 to rotate the measuring device 31 into position to discharge a measured quantity of fresh coffee into the said receptacle 34.

The construction and arrangement of the pawl 78 is such that these operations must be performed in the order described; that is to say, the receptacle 34 must first be emptied and thereafter the measuring device 31 operated.

The mechanisms just described are preferably enclosed in a suitable casing 82 on the exterior of the machine which will protect the parts thereof against injury from any cause.

The contents of the receptacle 34 when emptied will fall into a waste receptacle 85 suitably supported in a compartment formed at the rear of the machine. This waste receptacle may be withdrawn and emptied when convenient. In lieu of the waste receptacle 85, a chute may be provided which leads outwardly from the machine to any point where the spent coffee grounds may be discharged.

To facilitate cleaning of the receptacle 34 during the discharge operation and to insure perfect cleaning of the said receptacle, we have provided a water spray indicated by the general reference numeral 86. This spray communicates through a pipe 87 with any suitable source of water supply. The spray is provided with a conical valve 88 normally maintained on its seat by a spring 89 and is provided with an operating pin 90 projecting into the path of movement of the receptacle 34. This arrangement is such that when the receptacle 34 is swung to the dotted line position shown in Fig. 1, the pin 90 will be depressed against the action of the spring 89 thus moving the valve 88 off its seat. Thereupon a spray of water enters the receptacle 34 and washes out any grounds which may not have been removed by the jarring action when the receptacle was rotated.

It is desirable, also, to provide means for cleaning the filtration receptacle 34 and the coffee container 57. For this purpose we have provided a nozzle 95 communicating with the auxiliary water tank 40 and provided with a control valve 96. When it is desired to clean out the machine, the cold water may be admitted through the pipe 8 and, upon opening the valve 96, the water will flow through the nozzle 95 and into the receptacle 34. Thence the water passes into the coffee container 57 and may be withdrawn therefrom by opening either or both of the faucets 64.

We direct particular attention to the location of the auxiliary water tank 40 which, as will be noted from the drawings, is surrounded by the hot water in the jacket 3. It is essential in making good coffee that the water be maintained at a temperature of 208° to 210°; that is, just below boiling. When the required amount of water has been introduced into the tank 40, the surrounding hot water in the jacket will maintain the temperature of the water in the tank at the proper degree during the time said water is flowing to the water wheel.

The coffee, after it has been made, should be maintained at a temperature of 175° to 185°. This is accomplished in our machine because the outlet pipe for the coffee is located in the water chamber in the base wherein the water is maintained at a constant temperature by action of the thermostat 11, and, in addition, the coffee is maintained in a covered container which is insulated by an air space.

The third important consideration in the making of good coffee is the length of time the hot water is in contact with the ground coffee. Authorities agree that this time interval should be between two and one-half and three minutes. In our machine, this exact result is obtained by our unique water distributing system which can be regulated to comply with this important requirement.

It is believed that the foregoing description will make our invention clear to those skilled in the art and that they will readily appreciate the many advantages thereof. The machine is simple in construction and operation and will fully realize the objects hereinbefore set forth. Also, the method of making coffee as herein described will be found to produce the most satisfactory results.

We claim as our invention:

1. In a coffee making machine, a filtration receptacle for ground coffee, means for discharging water upon said ground coffee, said means including a water wheel, and tubes having apertures communicating with said water wheel for discharging a fine spray of water upon said ground coffee.

2. In a coffee making machine, a water jacket adapted to contain a supply of hot water, means for introducing cold water into said jacket, an auxiliary water tank adapted to receive the overflow of hot water when cold water is introduced into said jacket, and a siphon interposed between said tank and said jacket operative to maintain the water level in said jacket below the edge of said tank.

3. In a coffee making machine, a water jacket adapted to contain a supply of hot water, means for introducing additional water into said jacket, an auxiliary water tank adapted to receive the overflow of hot water when additional water is introduced into said jacket, and a siphon interposed between said tank and said jacket for preventing water in said jacket from spilling over into said tank when the water in said jacket expands upon being heated.

4. In a coffee making machine, the combination of a casing, a water jacket in said casing, means for introducing water into said jacket, means for heating the water in said jacket, an auxiliary tank in the upper portion of said casing adapted to receive the overflow of hot water from said jacket caused by the introduction of water thereinto, a filtration receptacle in said casing separate from said auxiliary tank for holding ground coffee to be infused, means for delivering water from said tank to said filtration receptacle, and a container in said casing for receiving the infusion from said receptacle.

5. In a coffee making machine, the combination of a casing, a water jacket in said casing, means for introducing water into said jacket, means for heating the water in said jacket, an auxiliary tank in the upper portion of said casing adapted to receive the overflow of hot water from said jacket caused by the introduction of water thereinto, a filtration receptacle in said casing separate from said auxiliary tank for holding ground coffee to be infused, means for delivering water from said tank to said filtration receptacle, means for regulating the flow of water thus delivered, and a container in said casing for receiving the infusion from said receptacle.

6. In a coffee making machine, the combination of a casing, a water jacket in said casing, means for introducing water into said jacket, means for heating the water in said jacket, an auxiliary tank in the upper portion of said casing adapted to receive the overflow of hot water from said jacket caused by the introduction of water thereinto, a filtration receptacle in said casing separate from said auxiliary tank for holding ground coffee to be infused, means for delivering water from said tank to said filtration receptacle, a control device outside of said casing for regulating the flow of water thus delivered, and a container in said casing for receiving the infusion from said receptacle.

7. In a coffee making machine, the combination of a casing, a water jacket in said casing, means for introducing water into said jacket, means for heating the water in said jacket, an auxiliary tank in the upper portion of said casing adapted to receive the overflow of water from said jacket caused by the introduction of water thereinto, a siphon interposed between said tank and said jacket, a filtration receptacle separate from said auxiliary tank in said casing, for holding ground coffee to be infused, means for delivering water from said tank to said filtration receptacle, and a container in said casing for receiving the infusion from said receptacle.

8. In a coffee making machine, the combination of a casing, a water jacket in said casing, means for introducing water into said jacket, means for heating the water in said jacket, an auxiliary tank in the upper portion of said casing adapted to receive the overflow of hot water from said jacket caused by the introduction of water thereinto and surrounded thereby at least in part, a filtration receptacle in said casing separate from said auxiliary tank for holding ground coffee to be infused, means for delivering water from said tank to said filtration receptacle, and a container in said casing for receiving the infusion from said receptacle.

9. In a coffee making machine, the combination of a casing, a water jacket in said casing, means for introducing water into said jacket, means for heating the water in said jacket, an auxiliary tank in the upper portion of said casing adapted to receive the overflow of hot water from said jacket caused by the introduction of water thereinto, a cover for said casing, a cover for said tank to prevent condensation dropping from said first cover into said tank, a filtration receptacle in said casing separate from said auxiliary tank for holding ground coffee to be infused, means for delivering water from said tank to said filtration receptacle, and a container in said casing for receiving infusion from said receptacle.

10. In a coffee making machine, the combination of a casing, a water jacket in said casing, means for introducing water into said jacket, means for heating the water in said jacket, an auxiliary tank in the upper portion of said casing adapted to receive the overflow of hot water from said jacket caused by the introduction of water thereinto, a filtration receptacle in said casing separate from said auxiliary tank for holding ground coffee to be infused, a water distributing device in said casing comprising a plurality of buckets for receiving water from said tank, means mounting said device whereby as one bucket discharges its contents another one is brought into position to receive water, means for conducting the water thus distributed to said filtration receptacle, and a container in said casing for receiving the infusion from said receptacle.

11. In a coffee making machine, the combination of a casing, a water jacket in said casing, means for introducing water into said jacket, means for heating the water in said jacket, an auxiliary tank in the upper portion of said casing adapted to receive the overflow of hot water from said jacket caused by the introduction of water thereinto, a filtration receptacle in said casing separate from said auxiliary tank for holding ground coffee to be infused, a water distributing device in said casing comprising a plurality of buckets for receiving water from said tank, means mounting said device whereby as one bucket discharges its contents another one is brought into position to receive water, a perforated conducting device for delivering the discharged water in successive charges to said filtration receptacle, and a container in said casing for receiving the infusion from said receptacle.

12. In a coffee making machine, the combination of a casing, a water jacket in said casing, means for introducing water into said jacket, means for heating the water in said jacket, an auxiliary tank in the upper portion of said casing adapted to receive the overflow of hot water from said jacket caused by the introduction of water thereinto, a filtration receptacle in said casing separate from said auxiliary tank for holding ground coffee to be infused, a receptacle in said casing having a corrugated bottom, a water distributing device in said last mentioned receptacle, means for conducting water from the corrugations of said bottom to said filtration receptacle, and a container in said casing for receiving the infusion from said receptacle.

13. In a coffee making machine, the combination of a casing, a water jacket in said casing, means for introducing water into the bottom of said jacket, means for heating the water in said jacket, a baffle in said jacket positioned to cause the water which is introduced to force hot water upwardly in said jacket, an auxiliary tank in the upper portion of said casing adapted to receive the hot water which has been forced upwardly in said jacket, a filtration receptacle in said casing separate from said auxiliary tank for holding ground coffee to be infused, means for conducting water from said tank to said filtration receptacle, and a container in said casing for receiving the infusion from said receptacle.

14. In a coffee making machine the combination of a casing, a water jacket in said casing, means for introducing water into said jacket, means for heating the water in said jacket, an auxiliary tank in the upper portion of said casing adapted to receive the overflow of hot water from said jacket caused by the introduction of water thereinto, a filtration receptacle in said casing separate from said auxiliary tank for holding ground coffee to be infused, means for delivering water from said tank to said filtration receptacle, a container in said casing, and a cover for said container having a restricted opening through which the infusion from said receptacle passes into said container.

15. In a coffee making machine the combination of a casing, a water jacket in said casing, means for introducing water into said jacket, means for heating the water in said jacket, an auxiliary tank in the upper portion of said casing adapted to receive the overflow of hot water from said jacket caused by the introduction of water thereinto, a filtration receptacle in said casing separate from said auxiliary tank for holding ground coffee to be infused, means for delivering water from said tank to said filtration receptacle, a container in said casing for receiving the infusion from said receptacle, said container being surrounded by a ventilated air space, and a drain leading from said air space to the outside of said casing.

16. In a coffee making machine, the combination of a casing, a filtration receptacle in said casing for holding ground coffee to be infused, a water distributing device in said casing comprising a plurality of buckets for receiving water, means mounting said device whereby as one bucket discharges its contents another one is brought into position to receive water, a perforated conducting device for delivering the discharged water in successive charges to said filtration receptacle, and a container in said casing for receiving the infusion from said receptacle.

HARRY HARPER.
CHARLES R. CARPENTER.